(12) United States Patent
Kim et al.

(10) Patent No.: US 11,636,566 B2
(45) Date of Patent: Apr. 25, 2023

(54) COMPUTING SYSTEM AND METHODS OF OPERATING THE COMPUTING SYSTEM

(71) Applicant: SAMSUNG ELECTRONICS CO., LTD., Suwon-si (KR)

(72) Inventors: Younggwan Kim, Seoul (KR); Taekhyun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/456,942

(22) Filed: Nov. 30, 2021

(65) Prior Publication Data

US 2022/0284538 A1 Sep. 8, 2022

(30) Foreign Application Priority Data

Mar. 2, 2021 (KR) .................. 10-2021-0027372

(51) Int. Cl.
*G06T 1/20* (2006.01)
*G06F 1/3203* (2019.01)
(52) U.S. Cl.
CPC .............. *G06T 1/20* (2013.01); *G06F 1/3203* (2013.01)
(58) Field of Classification Search
CPC .......... G06T 1/20; G06F 1/3203; Y02D 10/00
USPC ....................................... 345/522
See application file for complete search history.

(56) References Cited

U.S. PATENT DOCUMENTS

| 8,310,492 | B2 | 11/2012 | McCrary et al. |
| 8,614,704 | B2 | 12/2013 | Woo et al. |
| 9,384,522 | B2 | 7/2016 | Frascati et al. |
| 9,799,088 | B2 | 10/2017 | Frascati et al. |
| 2017/0300361 | A1 | 10/2017 | Lanka et al. |
| 2020/0104970 | A1 | 4/2020 | White et al. |
| 2020/0219223 | A1 | 7/2020 | Vembu et al. |

FOREIGN PATENT DOCUMENTS

KR 10-0668326 1/2007

*Primary Examiner* — Jacinta M Crawford
(74) *Attorney, Agent, or Firm* — F. Chau & Associates, LLC

(57) ABSTRACT

A method of operating a computing system includes receiving, by a GPU driver included in a CPU of the computing system, a plurality of commands associated with a plurality of rendering targets included in a frame buffer of the computing system, storing the plurality of commands in a command buffer included in the GPU driver, setting, by a command manager included in the GPU driver, at least one unused rendering target among the plurality of rendering targets to a delayed submission mode, and selectively deleting, by the command manager, a command associated with the at least one unused rendering target set to the delayed submission mode from the command buffer based on whether the command includes an instruction to invalidate a rendering result associated with the at least one unused rendering target.

20 Claims, 13 Drawing Sheets

COMPUTING SYSTEM AND METHODS OF OPERATING THE COMPUTING SYSTEM

CROSS-REFERENCE TO RELATED APPLICATIONS

This application claims priority under 35 U.S.C. § 119 to Korean Patent Application No. 10-2021-0027372, filed on Mar. 2, 2021, in the Korean Intellectual Property Office (KIPO), the disclosure of which is incorporated by reference herein in its entirety.

TECHNICAL FIELD

Embodiments of the inventive concept relate to a computing system, and more particularly, to a computing system and methods of operating the computing system.

DISCUSSION OF RELATED ART

Rendering may refer to a process of generating an image from a three-dimensional (3D) model or a two-dimensional (2D) model from a given view point. A computer system may be used as a graphics processing system for the rendering process, and the rendering process may be performed according to a graphics pipeline.

A graphic processing unit (GPU) of the graphics processing system may perform the rendering process according to the graphics pipeline based on commands received from a central processing unit (CPU). The relative performance of the GPU depends on a processing latency between the CPU and GPU.

SUMMARY

An embodiment of the inventive concept provides a method of operating a computing system capable of reducing power consumption and enhancing performance without increasing latency between a CPU and a GPU.

An embodiment of the inventive concept provides a computing system capable of reducing power consumption and enhancing performance without increasing latency between a CPU and a GPU.

According an embodiment of the inventive concept, a method of operating a computing system includes receiving, by a GPU driver included in a CPU of the computing system, a plurality of commands associated with a plurality of rendering targets included in a frame buffer of the computing system, storing the plurality of commands in a command buffer included in the GPU driver, setting, by a command manager included in the GPU driver, at least one unused rendering target among the plurality of rendering targets to a delayed submission mode, and selectively deleting, by the command manager, a command associated with the at least one unused rendering target set to the delayed submission mode from the command buffer based on whether the command includes an instruction to invalidate a rendering result associated with the at least one unused rendering target.

According to an embodiment of the inventive concept, a computing system includes a system bus, a system memory coupled to the system bus, a frame buffer included in the system memory, a graphics processing unit (GPU) coupled to the system bus, and a central processing unit (CPU) coupled to the system bus. The CPU includes a GPU driver configured to manage a plurality of commands associated with a plurality of rendering targets included in the frame buffer, and the plurality of commands are generated by an application program. The GPU driver includes a command buffer configured to store the plurality of commands and a command manager configured to set at least one unused rendering target among the plurality of rendering targets to a delayed submission mode based on instructions included in the plurality of the commands and selectively delete a command of the plurality of commands associated with the at least one unused rendering target set to the delayed submission mode from the command buffer when the command includes an instruction to invalidate a rendering result associated with the at least one unused rendering target set to the delayed submission mode.

According to an embodiment of the inventive concept, a method of operating a computing system including receiving, by a GPU driver included in a CPU of the computing system, a plurality of commands associated with a plurality of rendering targets included in a frame buffer of the computing system, storing the plurality of commands in a command buffer included in the GPU driver, setting, by a command manager in the GPU driver, at least one unused rendering target among the plurality of rendering targets to a delayed submission mode, deleting, by the command manager, a first command of the plurality of commands associated with the at least one unused rendering target from the command buffer in response to the first command including an instruction to invalidate a first rendering result associated with the at least one unused rendering target set to the delayed submission mode, and providing, by the command manager, a second command of the plurality of commands to a GPU included in the computing system in response to the second command not including an instruction to invalidate a second rendering result associated with the at least one unused rendering target set to the delayed submission mode.

BRIEF DESCRIPTION OF THE DRAWINGS

The above and other features of the inventive concept will become more apparent by describing in detail embodiments thereof with reference to the accompanying drawings, in which.

DETAILED DESCRIPTION

Figure 1:
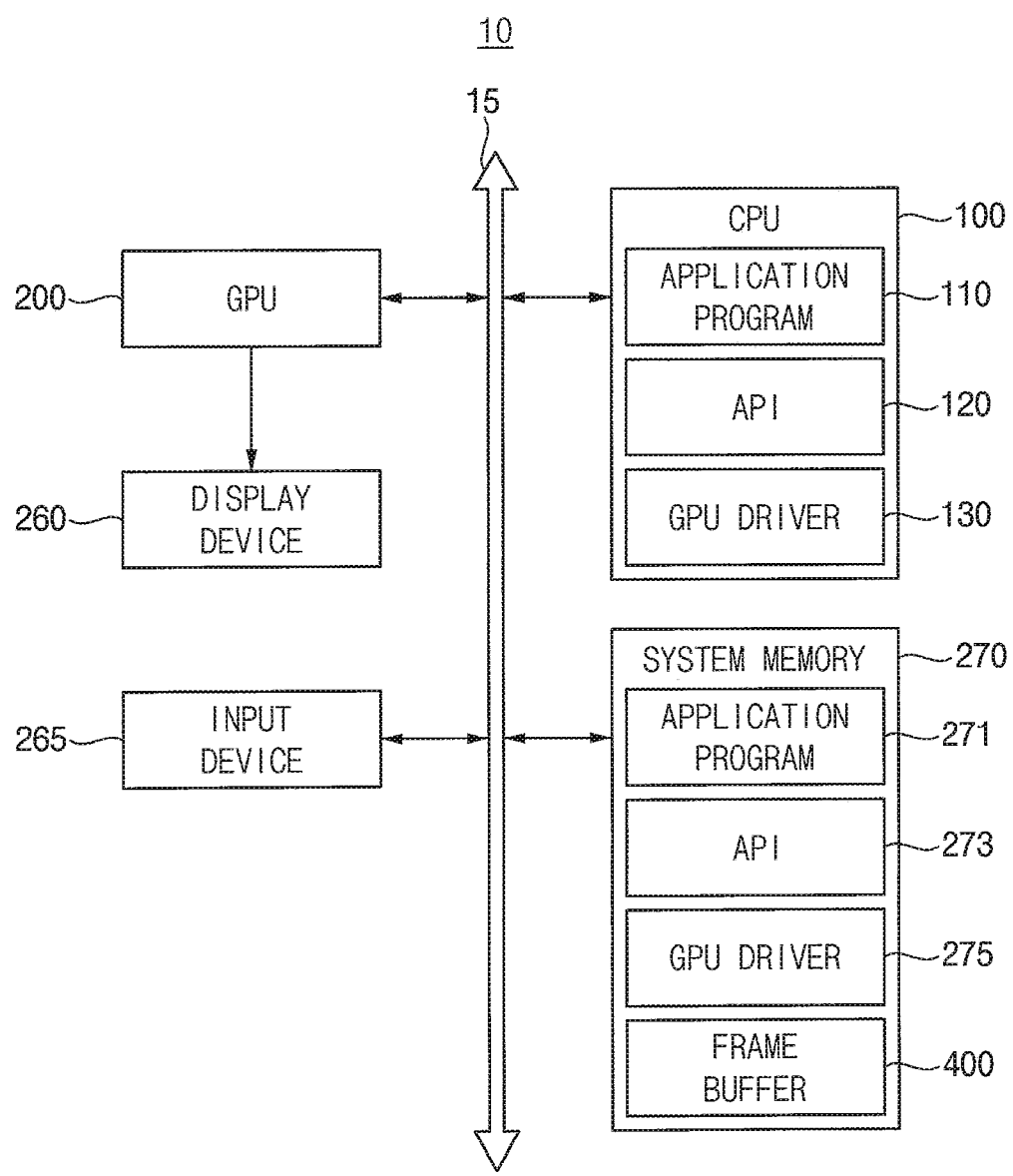
FIG. 1 is a block diagram of a computing system according to an embodiment of the inventive concept.

Embodiments of the inventive concept will be described more fully hereinafter with reference to the accompanying drawings. Like reference numerals may refer to like elements throughout the accompanying drawings.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

As used herein, the singular forms "a," "an", and "the" are intended to include the plural forms as well, unless the context clearly indicates otherwise.

As is traditional in the field of the inventive concept, embodiments are described and illustrated in the drawings in terms of functional blocks, units, and/or modules. Those skilled in the art will appreciate that these blocks, units, and/or modules may be physically implemented by electronic (or optical) circuits such as logic circuits, discrete components, microprocessors, hard-wired circuits, memory elements, wiring connections, etc.

Embodiments of the inventive concept provide a computing system and methods of operating the computing system that may avoid extraneous rendering by setting a rendering target to a delayed submission mode. When a GPU of the computing system receives a command from a CPU of the computing system that includes an instruction to invalidate a rendering result associated with the rendering target and to perform a rendering process in the rendering target, and the rendering target is set to the delayed submission mode, the CPU might not provide the command to the GPU and might not submit the rendering target to the GPU for the rendering process.

FIG. 1 is a block diagram of a computing system according to an embodiment of the inventive concept.

A computing system 10 may be a computing system that include a graphics processing unit (GPU) 200. The computing system 10 may be implemented as, for example, a stationary-type computing system such as a desktop computer, a server, a television set-top box, a video game console, or the like, or may be implemented as, for example, a portable computing system such as a laptop computer, a mobile phone, a wearable device, a portable media player, a tablet personal computer (PC), an e-book reader, or the like.

Referring to FIG. 1, the computing system 10 may include a central processing unit (CPU) 100, the GPU 200, a display device 260, an input device 265, a system memory 270, and a system bus 15.

In an embodiment, two or more components included in the computing system 10, e.g., two or more components from among the GPU 200, the CPU 100, and the system bus 15, may be integrated in a single processing system.

The system bus 15 may connect the GPU 200, the input device 265, the CPU 100, and the system memory 270. The GPU 200, the input device 265, the CPU 100, and the system memory 270 may communicate with each other via the system bus 15. In an embodiment, the system memory 270 may be directly connected to the CPU 100.

The CPU 100 may receive a user input via the input device 265. The CPU 100 may execute a series of instructions (or a program) stored in the system memory 270 and process data stored in the system memory 270 or direct the GPU 200 to perform a particular job in a graphics pipeline. The CPU 100 may drive a first application program 110, a first application program interface (API) 120, and a first GPU driver 130. In an embodiment, the CPU 100 may include two or more cores.

The first application program 110 may generate a plurality of commands, the first API 120 may transfer the plurality of commands to the first GPU driver 130, and the first GPU driver 130 may selectively provide commands of the plurality of commands to the GPU 200 based on whether rendering targets associated with the plurality of commands are set to a delayed submission mode.

The system memory 270 may store instructions and data to be processed by the CPU 100 and the GPU 200.

The system memory 270 may include a memory storing information. For example, the system memory 270 may include a volatile memory such as dynamic random access memory (DRAM), static random access memory (SRAM), mobile DRAM, double data rate synchronous dynamic random access memory (DDR SDRAM), low power DDR (LPDDR) SDRAM, graphics DDR (GDDR) SDRAM, Rambus dynamic random access memory (RDRAM), or the like, or may include a nonvolatile memory such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), or the like.

As illustrated in FIG. 1, the system memory 270 may include a second application program 271, a second API 273, a second GPU driver 275, and a frame buffer 400.

The frame buffer 400 may store data processed by and to be processed by the GPU 200.

Each of the second application program 271, the second API 273, and the second GPU driver 275 may be driven to the first application program 110, the first API 120, and the first GPU driver 130, respectively, by the CPU 100.

The second application program 271 may generate desired results in the form of, for example, a sequence of graphics images by generating calls to the second API 273 and may provide high-level shading programs to be processed by the second GPU driver 275 to the second API 273. The high-level shading programs may include source codes of high-level programming instructions designed to operate at least one shading engine (or a shader) in the GPU 200. In an embodiment, the second API 273 may be implemented in the second GPU driver 275. The second GPU driver 275 may translate the high-level shading programs to machine code shading programs that are optimized for a type of shading engine (e.g., a vertex shading engine, a geometry shading engine, a fragment shading engine, and the like).

The GPU 200 may receive commands provided from the CPU 100 and may render and display the images on the display device 260 in response to the commands received from the CPU 100.

The GPU 200 may store, in the frame buffer 400, data generated while processing the commands received from the CPU 100 and may display final images that are stored in the frame buffer 400 via the display device 260. In an embodiment, the GPU 200 may store, in an internal memory in the GPU 200, data generated while processing the commands received from the CPU 100 and may display final images that are stored in the internal memory via the display device 260.

The GPU 200 may include multi-processors capable of simultaneously executing a plurality of threads, and the GPU 200 may accordingly be referred to as a parallel processing unit (PPU). The multi-processors may be programmed to execute various operations, and some multi-processors may function as a shading engine that includes one or more programmable shaders.

In an embodiment, the GPU 200 may perform deferred shading. Deferred shading may refer to a method of separating a shading of a plurality of fragments (or pixels) from a calculation of complicated geometry and lighting conditions. In a first pass of the deferred shading, the GPU 200 may collect data needed for shading, and may render on an internal memory information about a color, a diffusion, a depth, a normal, a specularity, or the like. Next, a shader of the GPU 200 perform shading by calculating a lighting of each fragment of the plurality of fragments (or pixels).

In an embodiment, the GPU 200 may selectively shade the plurality of fragments. For example, the GPU 200 may shade only a first group of fragments of the plurality of fragments and may calculate a shading of a second group of fragments of the plurality of fragments (i.e., unshaded fragments) via interpolation from shaded peripheral fragments (i.e., shaded fragments of the first group of fragments adjacent to unshaded fragments of the second group of fragments).

Accordingly, computing resources consumed in shading (e.g., fragment shading) may be reduced, and as a result, a cost of the GPU 200 may be reduced and/or a time taken for completion of a graphics pipeline may be reduced. A method of performing selective shading and then performing interpolation as described above may be referred to as a multi-pass rendering method, and in the multi-pass rendering method, a quality of a final image may be determined based on an interpolation input (i.e., based on which fragments of the plurality of fragments are shaded).

The display device 260 may be implemented as a device capable of outputting a visible image, and may display final images provided by the GPU 200. For example, the display device 260 may be implemented as a liquid crystal display (LCD), a light-emitting diode (LED) display, an organic LED display, an active-matrix OLED (AMOLED) display, an electrochromic device (ECD), a digital mirror device (DMD), an actuated mirror device (AMD), a grating light valve (GLV), a plasma display panel (PDP), an electroluminescent display (ELD), a vacuum fluorescent display (VFD), or the like, and may be in the form of a flat panel display, a curved display, a flexible display, or the like.

Figure 2:
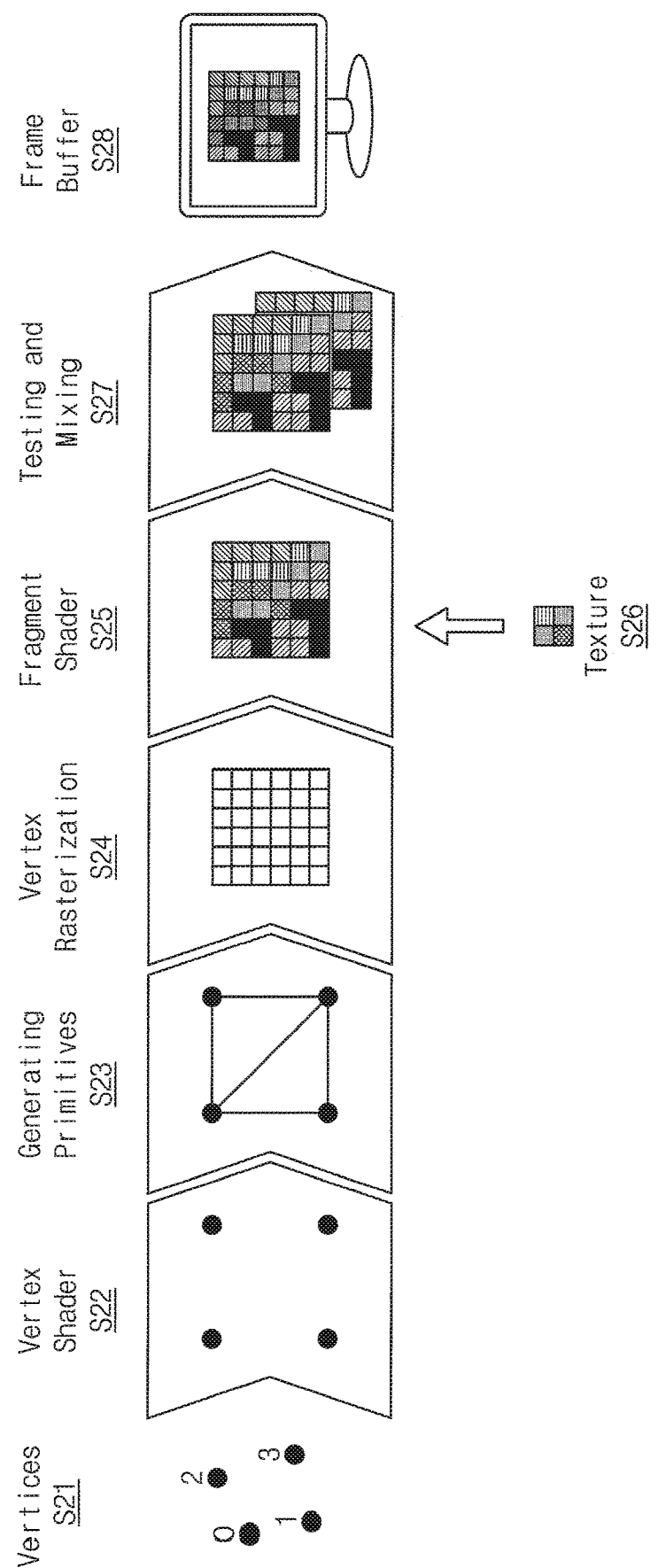
FIG. 2 illustrates a graphics pipeline according to an embodiment of the inventive concept.

FIG. 2 illustrates a graphics pipeline according to an embodiment of the inventive concept.

In an embodiment, the GPU 200 of FIG. 1 may perform the graphics pipeline of FIG. 2 (i.e., operations S21 through S28).

For example, in the computing system 10 of FIG. 1, the first application program 110 may provide data and commands to the GPU 200 via the first GPU driver 130, and in response to the data and commands, the GPU 200 may perform the graphics pipeline.

Referring to FIG. 2, the graphics pipeline may be divided into a geometry transformation and vertex generation operation S21, a vertex shading operation S22, a primitive generation operation S23, a rasterization operation S24, a fragment shading operation S25, a texturizing operation S26, a testing and mixing operation S27, and a final image or rendering result generation operation S28.

Referring to FIG. 2, in operation S21, vertices may be generated. For example, vertices 0, 1, 2, and 3 may be generated and may indicate three-dimensional objects.

In operation S22, vertex shading may be performed. For example, positions of the vertices generated in operation S21 may be defined by vertex shading.

In operation S23, a primitive may be generated. A primitive may refer to a point, a line, a polygon, or the like, formed using at least one vertex. For example, when the primitive is a triangle, the primitive is defined by three connected vertices.

In operation S24, rasterization of the primitive may be performed. Rasterization of the primitive may refer to dividing the primitive into at least one fragment of a plurality of fragments, e.g., a base unit for performing graphics processing on the primitive. The primitive generated in operation S23 may include information about the vertices, and as the at least one fragment is formed between the vertices in operation S23, graphics processing may be subsequently performed.

In operation S25, fragment shading of fragments of the plurality of fragments may be performed. In operation S25, a shaded fragment may be related to a pixel on a screen space, and fragment shading may be referred to as pixel shading. For example, a fragment may correspond to a base unit of graphics processing constituting a primitive, whereas a pixel may correspond to a base unit of graphics processing performed following fragment shading. In embodiments of the inventive concept, fragments and/or pixels may be used.

In operation S26, texturing may be performed. Texturing may refer to determining a color of fragments (or pixels) based on previously provided textures. Determining colors of pixels based on previously provided textures may use less computing resources than determining colors of pixels without previously provided textures. In an embodiment, textures of different resolutions may be provided in advance, or colors of pixels may be determined by mixing textures according to positions and sizes of objects. Indicating textures in fragments may be referred to as texture fetching.

In operation S27, testing and mixing may be performed. For example, with respect to pixels corresponding to an identical position, a pixel to be finally displayed may be determined through a depth test. In addition, curling and clipping or the like may be performed, and a value of a pixel to be finally displayed, e.g., a color, may be determined.

Next, in operation S28, a final image generated in operations S21 through S27 may be stored in the frame buffer 400, and the final image stored in the frame buffer may be displayed on the display device 260.

As described above with reference to FIG. 1, the GPU 200 in FIG. 1 may generate a final image, based on a multi-pass rendering method, by shading a first group of fragments of a plurality of fragments and then performing interpolation. For example, in operation S25 of the graphics pipeline of FIG. 2, the first group of fragments may be selected (this may also be referred to as fragment sampling) and selected (or sampled) fragments of the first group of fragments may be shaded, whereas non-selected (or unshaded) fragments of a second group of the plurality of fragments may be calculated from the shaded fragments of the first group of fragments adjacent to the unshaded fragments of the second group of fragments. By selecting fragments based on the internal memory in the GPU 200, the selected fragments may correspond to a final image, thus preventing image distortion or aliasing due to inappropriate interpolation.

Figure 3:
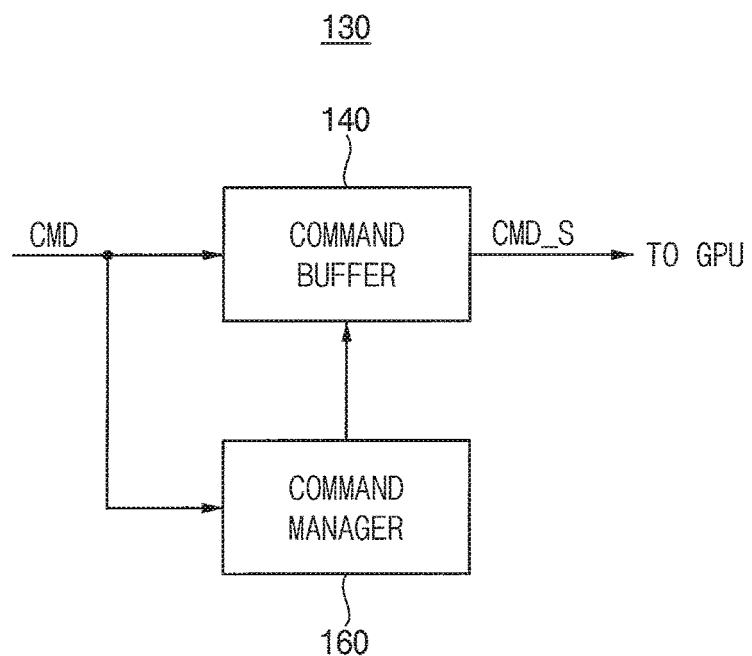
FIG. 3 is a block diagram of a GPU driver of a CPU of FIG. 1 according to an embodiment of the inventive concept.

FIG. 3 is a block diagram of the first GPU driver 130 of the CPU 100 of FIG. 1 according to an embodiment of the inventive concept.

Referring to FIG. 3, the first GPU driver 130 may include a command buffer 140 and a command manager 160.

The first GPU driver 130 may receive a plurality of commands CMD from the first application program 110 via the first API 120 and may store the plurality of commands CMD in the command buffer 140. Each command of the plurality of commands CMD may be associated with a corresponding rendering target of a plurality of rendering targets implemented in the frame buffer 400 and may include an instruction associated with the corresponding rendering target and a pointer designating a region of the frame buffer 400. The command manager 160 may receive the plurality of commands CMD and may manage the plurality of commands CMD based on the instructions included in the plurality of commands CMD.

For example, the command manager 160 may set at least one unused rendering target of the plurality of rendering targets to the delayed submission mode in response to the instructions and may selectively delete a command of the plurality of commands CMD associated with the at least one unused rendering target based on whether a rendering result corresponding to the at least one unused rendering target is invalidated by the instructions. The term "unused" in this context may refer to a rendering target that is associated with a rendering result that has been invalidated.

The command manager 160 may set the at least one unused rendering target to the delayed submission mode in response to processing a number of consecutive invalidation commands of the plurality of commands CMD (i.e., commands including an instruction to invalidate a rendering result associated with the rendering target) equal to a reference number. The reference number may be an integer. The reference number may be stored in a register in the command manager 160. Alternatively, the reference number may be stored in a register outside of the command manager 160 and may be provided to the command manager 160.

The command manager 160 may process a command of the plurality of commands CMD stored in the command buffer 140 including an instruction to display a rendering result associated with the at least one unused rendering target that is in the delayed submission mode. The command manager 160 may provide the command to the GPU 200 as a selected command CMD_S and the first GPU driver 130 may submit the at least one unused rendering target to the GPU 200. In response to receiving the selected command and the at least one unused rendering target, the GPU 200 may render an object (e.g., a rendering result or a final image or a fragment) in a region of the frame buffer 400 based on the command received from the CPU 100 and the at least one unused rendering target and may display the object (e.g., the rendering result or the final image or the fragment) via the display device 260.

The command manager 160 may process a command of the plurality of commands stored in the command buffer 140 including an instruction to invalidate a rendering result associated with the at least one unused rendering target set to the delayed submission mode. In response, the command manager 160 may delete the command from the command buffer 140. Accordingly, the CPU 100 may reduce latency between the CPU 100 and the GPU 200 by avoiding extraneous rendering commands from being provided to the GPU 200, thereby avoiding extraneous rendering operations of the GPU 200. Therefore, the CPU 100 may reduce power consumption and enhance performance of the GPU 200.

Figure 4:
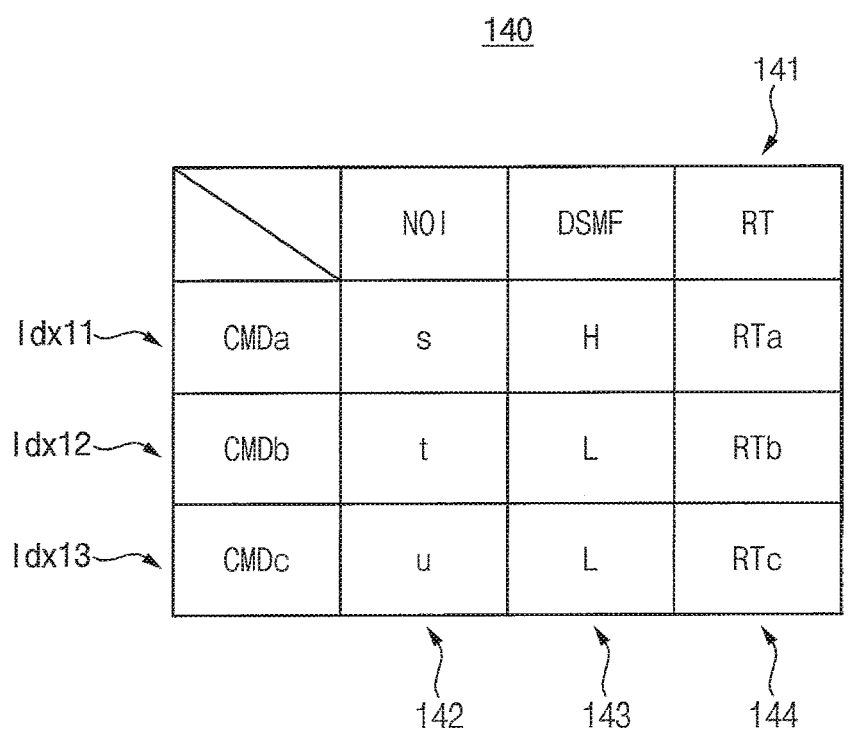
FIG. 4 illustrates a command buffer of FIG. 3
Figure 5:
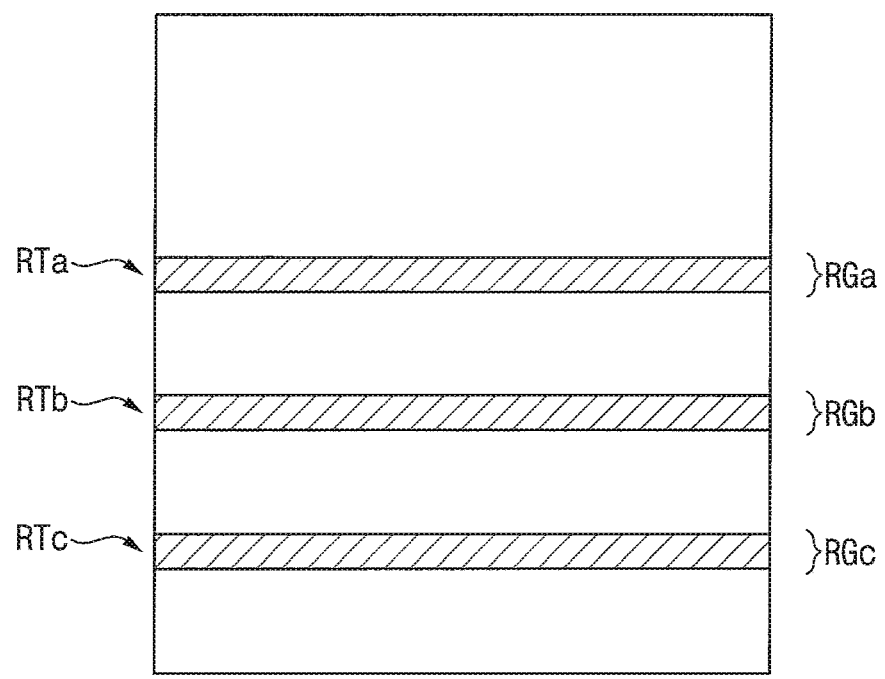
FIG. 5 illustrates a frame buffer of FIG. 1 according to an embodiment of the inventive concept.

FIG. 4 illustrates the command buffer 140 of FIG. 3, and FIG. 5 illustrates the frame buffer 400 of FIG. 1 according to an embodiments of the inventive concept.

Referring to FIGS. 4 and 5, the command buffer 140 may include a command table 141. The command table 141 may include, for example, first to third indices Idx11, Idx12, and Idx13, although the command buffer 140 may alternatively store more or less than three indices. The first to third indices Idx11, Idx12, and Idx13 may respectively store first to third rendering targets RTa, RTb, and RTc, the consecutive invalidation numbers NOI corresponding to first to third commands CMDa, CMDb, and CMDc respectively associated with the first to third rendering targets RTa, RTb, and RTc, and delayed submission mode flags DSMF for the first to third rendering targets RTa, RTb, and RTc.

The command table 141 may include, for example, first to third columns 142, 143, and 144, although the command table 141 may alternatively store more or less than three columns.

The first column 142 may store the consecutive invalidation numbers NOI corresponding to the first to third commands CMDa, CMDb, and CMDc respectively associated with the first to third rendering targets RTa, RTb and RTc. The first consecutive invalidation number NOI for the first rendering target RTa may be s, the second consecutive invalidation number NOI for the second rendering target RTb may be t, and the third consecutive invalidation number NOI for the third rendering target RTc may be u, where s, t, and u are natural numbers, and may be initially equal to zero.

Each time a command is received that includes an instruction to invalidate a rendering result associated with a particular rendering target, the first GPU driver 130 may add one to a consecutive invalidation number NOI that corresponds to the particular rendering target. Each time a command is received that includes an instruction to display a rendering result associated with a particular rendering target, and does not include an instruction to invalidate the rendering result, the consecutive invalidation number may be reset to zero.

The second column 143 may store the delayed submission mode flags DSMF for the first to third rendering targets RTa, RTb, and RTc, for example. When the first consecutive invalidation number NOI for the first rendering target RTa s is equal to or greater than the reference number, for example, the delayed submission mode flag DSMF for the first rendering target RTa may be set to or maintained at a high level ('H'). When the second consecutive invalidation number NOI for the second rendering target RTb t is less than the reference number, for example, the delayed submission mode flag DSMF for the second rendering target RTb may be set to a low level ('L'). When the third consecutive invalidation number NOI for the third rendering target RTc u is less than the reference number, for example, the delayed submission mode flag DSMF for the third rendering target RTc may be set to a low level ('L'). When a particular delayed submission flag DSMF is set to a high level, the first GPU driver 130 may set an unused rendering target corresponding to the delayed submission flag DSMF to the delayed submission mode.

The third column 144 may store, for example, the first to third rendering targets Rta, RTb, and RTc, respectively associated with the first to third commands CMDa, CMDb, and CMDc, although the command table 141 may alternatively store more or less than three rendering targets. The first rendering target RTa associated with the first command CMDa may designate a first region RGa of the frame buffer 400, the second rendering target RTb associated with the second command CMDb may designate a second region RGb of the frame buffer 400, and the third rendering target RTc associated with the third command CMDc may designate a third region RGc of the frame buffer 400. Each of the first to third regions RGa, RGb, and RGc may store rendering results of the GPU 200 when each of the first to third commands CMDa, CMDb, and CMDc is provided to the GPU 200.

Figure 6:
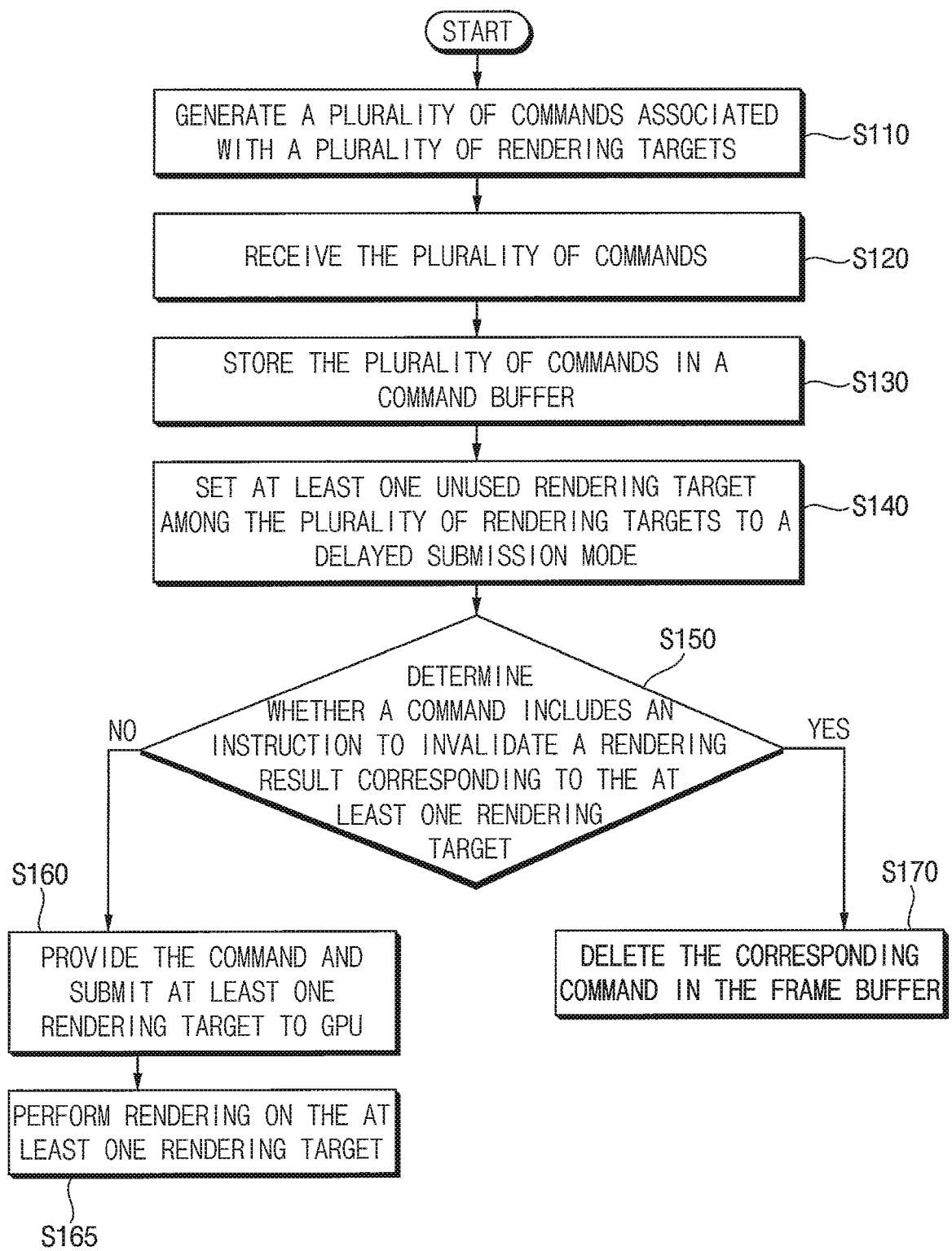
FIG. 6 is a flow chart illustrating a method of operating a computing system according to an embodiment of the inventive concept.

FIG. 6 is a flow chart illustrating a method of operating a computing system according to an embodiment of the inventive concept.

Referring to FIGS. 1 through 6, the computing system 10 may include the CPU 100, the first application program 110 running on the CPU 100, the GPU 200, and the frame buffer 400 coupled to each other through the system bus 15. The first application program 110 may generate a plurality of commands associated with a plurality of rendering targets implemented in the frame buffer 400 (operation S110).

A first GPU driver 130 in the CPU 100 may receive the plurality of commands (operation S120) and store the plurality of commands in a command buffer 140 in the first GPU driver 130 (operation S130).

A command manager 160 in the first GPU driver 130 may set at least one unused rendering target among the plurality of rendering targets to a delayed submission mode based on instructions included in the plurality of commands (operation S140). The command manager 160 may set the at least one unused rendering target to delayed submission mode in response to a delayed submission mode flag associated with the at least one unused rendering target being set to a high level in response to a consecutive invalidation number associated with the at least one unused rendering target being equal to the reference number.

The command manager 160 may determine whether a command of the plurality of commands includes an instruction to invalidate a rendering result associated with the at least one unused rendering target (operation S150).

When the command does not include an instruction to invalidate a rendering result corresponding to the at least one unused rendering target (NO in the operation S150), the command manager 160 may provide the command to the GPU and may submit the at least one unused rendering target to the GPU (operation S160). The GPU 200 may then render an object in the frame buffer 400 based on the command and the at least one unused rendering target (operation S165).

When the command includes an instruction to invalidate a rendering result associated with the at least one unused rendering target (YES in the operation S150), the command manager 160 may delete the corresponding command in the command buffer 140 (operation S170). As the command is not provided to the GPU 200, the GPU 200 may therefore avoid extraneous rendering of the at least one unused rendering target.

Figure 7A:
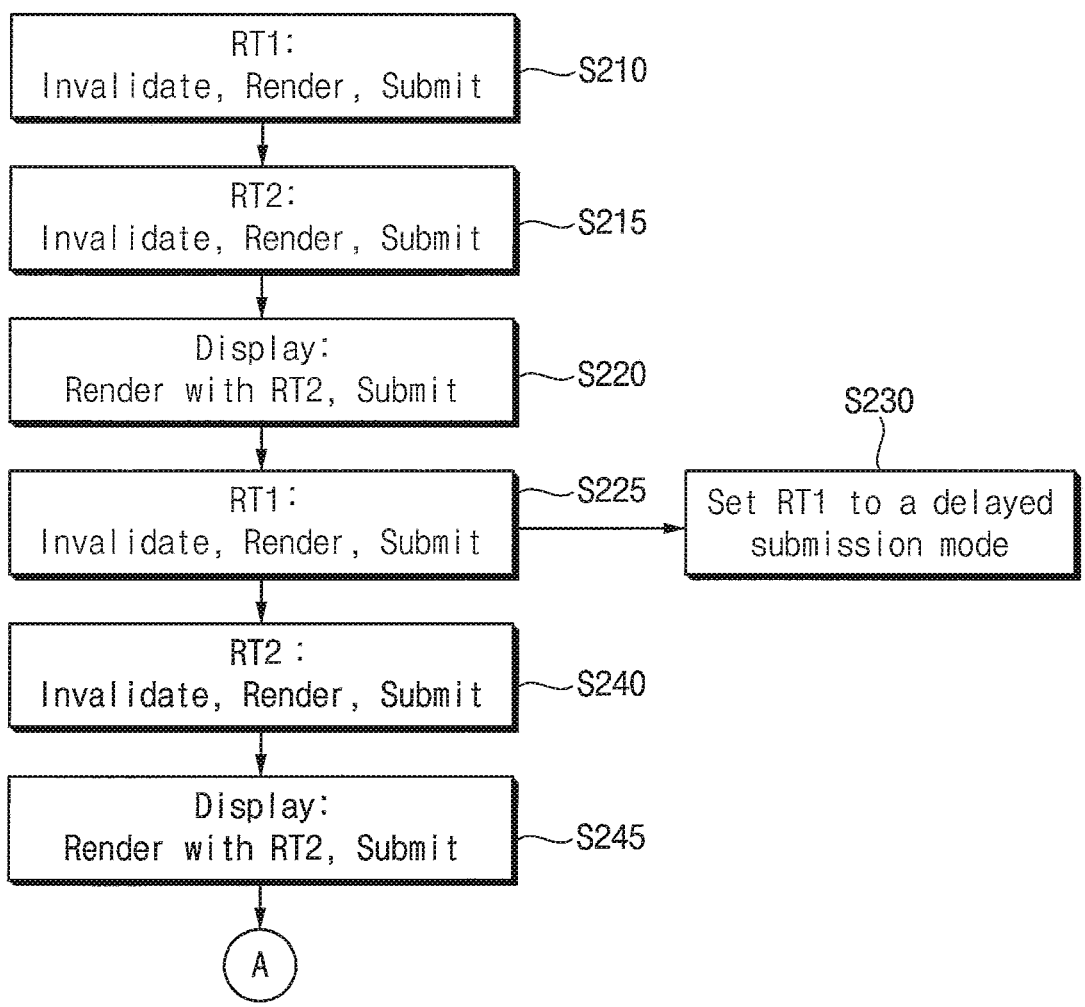
FIGS. 7A and 7B are flow charts illustrating operations of the method of FIG. 6 according to an embodiment of the inventive concept.
Figure 7B:
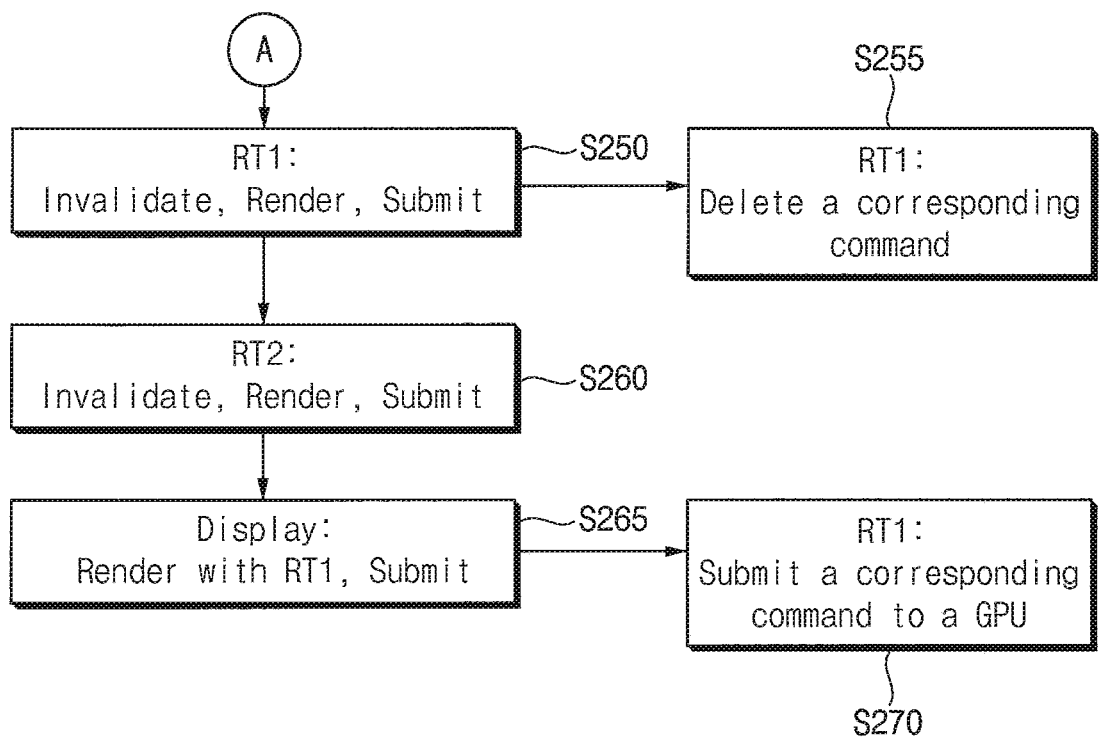

FIGS. 7A and 7B are flow charts illustrating an operation of the computing system 10 of FIG. 1 according to an embodiment of the inventive concept.

Referring to FIGS. 1 through 7B, the plurality of rendering targets may include a first rendering target RT1 and a second rendering target RT2. The first rendering target RT1 may be associated with a first frame buffer object attached to a first region of the frame buffer 400 and the second rendering target RT2 may be associated with a second frame buffer object attached to a second region of the frame buffer 400. The plurality of commands may include a first plurality of command associated with the first rendering target RT1 and a second plurality of command associated with the second rendering target RT2. Referring to FIGS. 4, 7A, and 7B, the reference number may be two, for example. However, the reference number may alternatively be any natural number. A consecutive invalidation number NOI may be associated with the first rendering target RT1 ("the first NOI"), and a consecutive invalidation number NOI may be associated with the second rendering target RT2 ("the second NOI"). Both the first NOI and the second NOI may be equal to zero.

For example, in operation S210, the first GPU driver 130 may receive a first command of the first plurality of commands associated with the first rendering target RT1 from the first application program 110. The first command may include instructions to invalidate a previous rendering result of rendering the first rendering target RT1, perform rendering in the first rendering target RT1, and submit the first rendering target RT1. In response to receiving the first command, the first GPU driver 130 may invalidate the previous rendering result, provide the first command to the GPU 200, submit the first rendering target RT1 to the GPU 200 for rendering, and add one to the first NOI. As there was no previous command to increase the first NOI, the first NOI is equal to one. As the first NOI is equal to one, and one is less than the reference number of two, a delayed submission mode flag corresponding to the first rendering target ("a first flag") is set to a low level. In response to receiving the first command and the first rendering target RT1, the GPU 200 may render an object from the first rendering target RT1.

For example, in operation S215, the first GPU driver 130 may receive a second command of the second plurality of commands associated with the second rendering target RT2 from the first application program 110. The second command may include instructions to invalidate a previous rendering result of rendering the second rendering target RT2, perform rendering in the second rendering target RT2, and submit the second rendering target RT2. In response to receiving the second command, the first GPU driver 130 may invalidate the previous rendering result, provide the second command to the GPU 200, submit the second rendering target RT1 to the GPU 200 for rendering, and add one to the second NOI. As there was no previous command to increase the second NOI, the second NOI is equal to one. As the second NOI is equal to one, and one is less than the reference number of two, a delayed submission mode flag corresponding to the second rendering target ("a second flag") is set to a low level. In response to receiving the second command and the second rendering target RT2, the GPU 200 may render an object from the second rendering target RT2.

For example, in operation 5220, the first GPU driver 130 may receive a first display command (a third command of the first plurality of commands) associated with the second rendering target RT2 from the first application program 110. The first display command may include instructions to perform rendering in the second rendering target RT2 and submit the second rendering target RT2. In response to receiving the first display command, the first GPU driver 130 may provide the first display command to the GPU 200 and submit the second rendering target to the GPU 200 for rendering. In response to receiving the first display command and the second rendering target RT2, the GPU 200 may render an object from the second rendering target RT2 and may display the rendered object via the display device 260. As the first display command does not include an instruction to invalidate a previous rendering result of rendering the second rendering target RT2, the first GPU driver 130 may reset the second NOI to zero.

For example, in operation S225, the first GPU driver 130 may receive a fourth command of the first plurality of commands associated with the first rendering target RT1 from the first application program 110. The fourth command may include instructions to invalidate a previous rendering result of rendering the first rendering target RT1, perform rendering in the first rendering target RT1, and submit the first rendering target RT1. In response to receiving the fourth command, the first GPU driver 130 may invalidate the previous rendering result, provide the fourth command to the GPU 200, submit the first rendering target RT1 to the GPU 200 for rendering, and add one to the first NOI. Because the first NOI is equal to the reference number, which is two, the first flag is set to high. In response to receiving the fourth command and the first rendering target RT1, the GPU 200 may render an object from the first rendering target RT1.

For example, in operation S230, the command manager 160 may set the first rendering target to a delayed submission mode in response to the first flag being set to high.

For example, in operation S240, the first GPU driver 130 may receive a fifth command of the second plurality of commands associated with the second rendering target RT2 from the first application program 110. The fifth command may include instructions to invalidate a previous rendering result of rendering the second rendering target RT2, perform rendering in the second rendering target RT2, and one to the second NOI, and submit the second rendering target RT2. In response to receiving the fifth command, the first GPU driver 130 may invalidate the previous rendering result, provide the fifth command to the GPU 200, submit the second rendering target RT1 to the GPU 200 for rendering, and add one to the second NOI. In response to receiving the fifth command and the second rendering target RT2, the GPU 200 may render an object from the second rendering target RT2.

For example, in operation S245, the first GPU driver 130 may receive a second display command (a sixth command of the plurality of second commands) associated with the second rendering target RT2 from the first application program 110. The second display command may include instructions to perform rendering in the second rendering target RT2 and submit the second rendering target RT2. In response to receiving the second display command, the first GPU driver 130 may provide the second display command to the GPU 200 and submit the second rendering target RT2 to the GPU 200 for rendering. In response to receiving the second display command and the second rendering target RT2, the GPU 200 may render an object from the second rendering target RT2 and display the rendered object via the display device 260. As the second display command does not include an instruction to invalidate a previous rendering result of rendering the second rendering target RT2, the first GPU driver 130 may reset the second NOI to zero.

For example, in operation S250, the first GPU driver 130 may receive a seventh command of the first plurality of commands associated with the first rendering target RT1 from the first application program 110. The seventh command may include instructions to invalidate a previous rendering of the first rendering target RT1, perform rendering in the first rendering target RT1, add one to the first NOI, and submit the first rendering target RT1. However, because the first GPU driver 130 receives the seventh command while the first rendering target is in the delayed submission mode, and the seventh command includes instructions to invalidate a rendering result associated with the first rendering target RT1, in operation S255, the command manager 160 may delete the seventh command in the command buffer 140.

For example, in operation S260, the first GPU driver 130 may receive an eighth command of the second plurality of commands associated with the second rendering target RT2 from the first application program 110. The eighth command may include instructions to invalidate a previous rendering result of rendering the second rendering target RT2, perform rendering in the second rendering target RT2, add one to the second NOI, and submit the second rendering target RT2. In response to receiving the eighth command, the first GPU driver 130 may invalidate the previous rendering result, provide the eighth command to the GPU 200, submit the second rendering target RT2 to the GPU 200 for rendering, and add one to the second NOI. Because the second NOI is equal to one, which is less than the reference number, which is equal to two, the second flag remains set to low and the command manager 160 does not set the second rendering target RT2 to the delayed submission mode. In response to receiving the eighth command and the second rendering target RT2, the GPU 200 may render an object from the second rendering target RT2.

For example, in operation S265, the first GPU driver 130 may receive a third display command (a ninth command of the first plurality of commands) associated with the rendering target RT1 from the first application program 110. The third display command may include instructions to perform rendering in the first rendering target RT1 and submit the first rendering target RT1. In response to receiving the third display command, the first GPU driver 130 may provide the third display command to the GPU 200 and submit the first rendering target RT1 to the GPU 200 for rendering. In operation 5270, in response to receiving the third display command and the first rendering target RT1, the GPU 200 may render an object from the first rendering target RT1 and display the rendered object via the display device 260. As the third display command does not include an instruction to invalidate a previous rendering result of rendering the first rendering target RT1, the first GPU driver 130 may reset the first NOI to zero.

Figure 8:
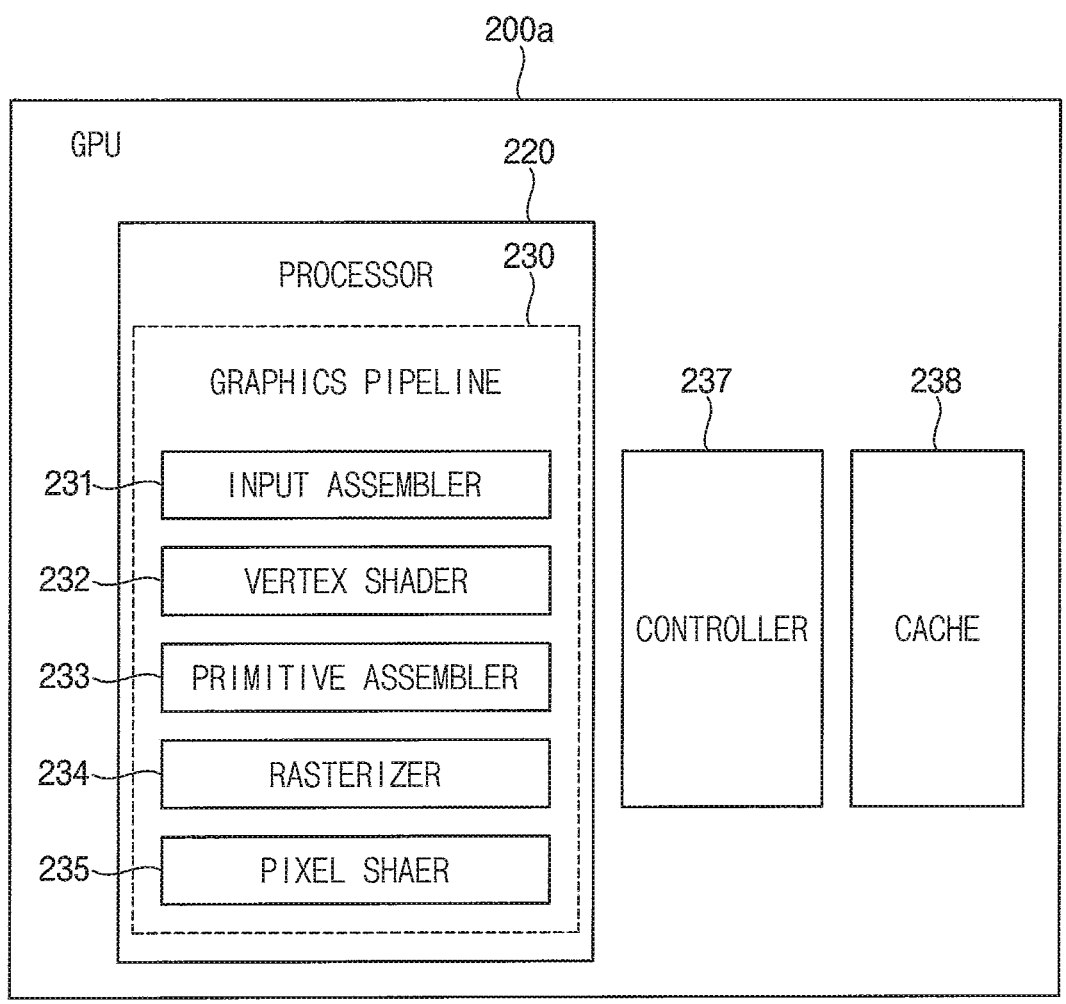
FIG. 8 is a block diagram of a GPU according to an embodiment of the inventive concept.

FIG. 8 is a block diagram of a GPU according to an embodiment of the inventive concept.

Referring to FIG. 8, a GPU 200a may include, for example, at least one processor 220 performing the graphics pipeline 230, a controller 237, and at least one cache (cache memory) 238. In an embodiment, the GPU 200a may be implemented as the GPU 200.

The graphics pipeline 230 may include an input assembler 231, a vertex shader 232, a primitive assembler 233, a rasterizer 234, and a pixel shader 235.

The above-described components of the graphics pipeline 230 in the processor 220 may be classified, for example, based on functions that will be described later. Accordingly, the components of the graphics pipeline 230 may be implemented as program logic or software modules that execute the functions to be described later, or may alternatively be implemented with sub-processing units (or processor cores) provided in the processor 220. In an embodiment, implementation of the components of the graphics pipeline 230 is not limited to any one processor core.

The names of the components of the graphics pipeline 230 in the GPU 200a may be provided for ease of description, or based on functionality. Thus, the name of the components may change with a kind, a version, etc. of a graphics API. For example, the components of the graphics pipeline 230 in the processor 220 may variously correspond to names of components that are defined in various kinds of APIs such as DirectX, CUDA, and OpenGL.

The input assembler 231 may provide the graphics pipeline 230 with data relating to vertices associated with objects stored in the system memory 270 in FIG. 1, based on input drawcalls. The vertices provided to the graphics pipeline 230 may refer to, but are not limited thereto, a patch that is an expression of a mesh or a surface.

The drawcall may be a command indicating whether to render any object at any frame. For example, the drawcall may be a command for drawing primitives, such as triangles or quadrangles, at an image or frame.

The vertex shader 232 may determine coordinates of each vertex on a 3D space based on information regarding locations of vertices included in a frame, attributes of the vertices, etc.

The primitive assembler 233 may convert vertices into primitives.

The rasterizer 234 may perform rasterizing for converting primitives into pixel values in a 2D space.

The pixel shader 235 may create a fragment that refers to pixels covered by a primitive and may determine a depth value, a stencil value, a color value, etc. of the fragment. The pixel shader 235 may include a texture unit that performs operations associated with texturing and may perform texturing of an object. A pixel shading result of the pixel shader 235 may be displayed as a frame of a video after being stored in the cache 238.

The controller 237 may control the functions and operations of the components 231 to 235 of the graphics pipeline 230 and the cache 238.

The cache 238 may store results that are processed while the graphics pipeline 230 is performed (for example, textures and frames). The cache 238 may provide the processor 220 with data used to perform the graphics pipeline 230 (for example, vertex data, primitive data, and texture data).

Figure 9:
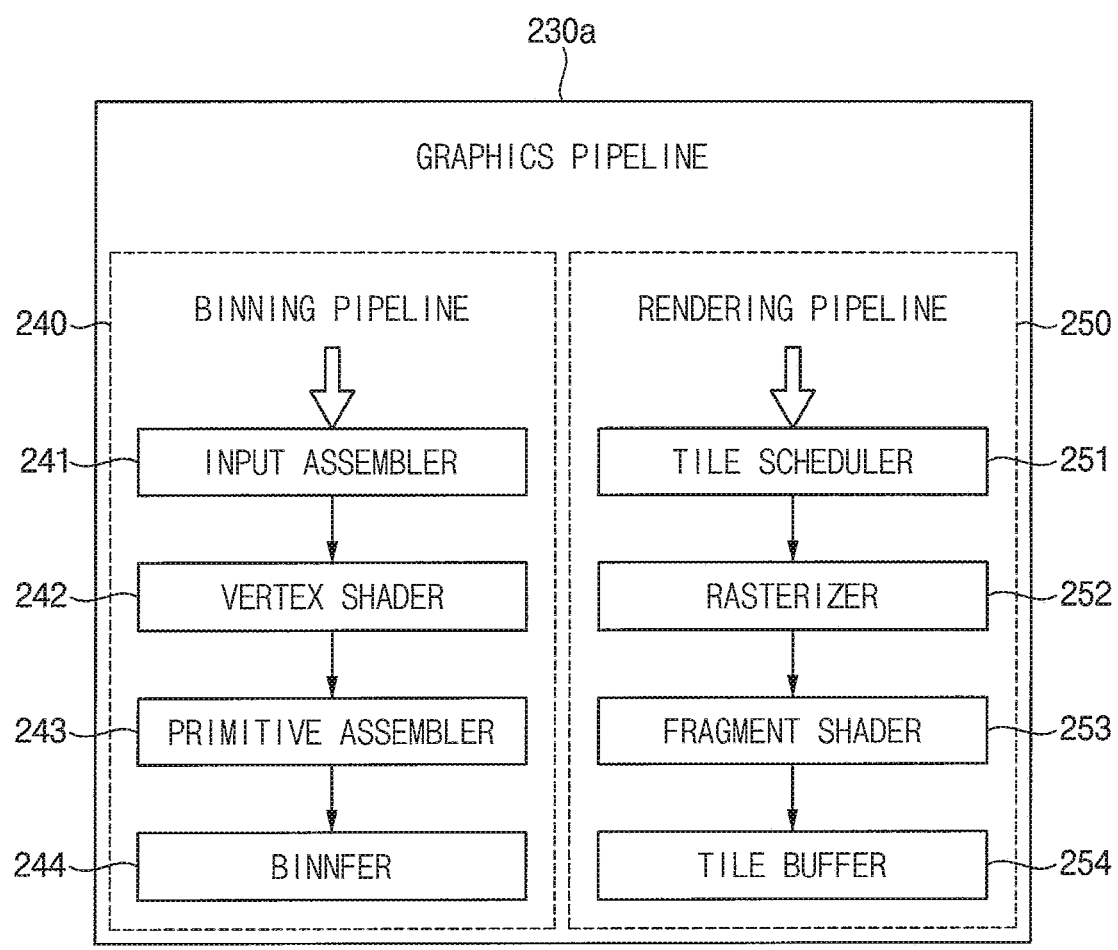
FIG. 9 is a diagram illustrating graphics pipelines performing tile-based rendering according to an embodiment of the inventive concept.

FIG. 9 is a diagram illustrating a graphics pipeline performing tile-based rendering (TBR) according to an embodiment of the inventive concept.

Referring to FIG. 9, a graphics pipeline 230a for the TBR may include, for example, a binning pipeline 240 generating information about a primitive list corresponding to respective tiles and a rendering pipeline 250 performing the rendering per tile based on information about the generated primitive list. In an embodiment, the graphics pipeline 230a may be implemented as the graphics pipeline 230.

The binning pipeline 240 may include an input assembler 241, a vertex shader 242, a primitive assembler 243, and a binner 244.

The input assembler 241 may generate vertices. The input assembler 241 may generate vertices for displaying objects included in the 3D graphics based on the draw command received from the CPU 100. The generated vertices may relate to a patch that is a representation of a mesh or a surface. However, embodiments of the inventive concept are not necessarily limited thereto.

The vertex shader 242 may perform the shading for vertices that have been generated by the input assembler. The vertex shader 242 may perform the shading for the generated vertices by specifying locations of the generated vertices.

The primitive assembler 243 may transform the vertices to a plurality of primitives. The primitive may denote a point, a line, a polygon, etc. formed by using at least one vertex. As an example, the primitive may be expressed by a triangle formed by connecting a plurality of the vertices.

The binner 244 may perform binning or tiling based on the primitives output from the primitive assembler 243. For example, the binner 244 may perform a depth test or a tile Z test and generate (or bin) a bitstream that represents information about tiles to which the primitives belong.

The rendering pipeline 250 may include, for example, a tile scheduler 251, a rasterizer 252, a fragment shader 253, and a tile buffer 254.

The tile scheduler 251 may schedule a sequence of tiles to be processed by the rendering pipeline 250, and the sequence of tiles may be processed per tile. The tile scheduler may generate a tile list and include the schedule of the sequence of tiles in the generated tile list.

The rasterizer 252 may transform the primitives to pixel values in a 2D space based on the generated tile list. Since the primitives include information relating to vertices only, the rasterizer 252 may perform the graphics processing for the 3D graphics by generating fragments between the vertices in operation 222.

The fragment shader 253 may generate fragments and determine depth values, stencil values, color values, etc. of fragments. The fragments may denote pixels covered by the primitives.

The tile buffer 254 may store a fragment shading result.

Rendering results generated in operations described above may be stored in the frame buffer 400, which may be a storage space allocated in the system memory 270. In addition, the rendering results that are stored in the frame buffer 400 may be displayed via the display device 260 as frames of a video image.

While FIGS. 8 and 9 illustrate components of the graphics pipeline 230, the graphics pipeline 230 is not limited thereto and may alternatively or additionally include components performing other operations, such as a tessellation pipeline and the like.

Figure 10:
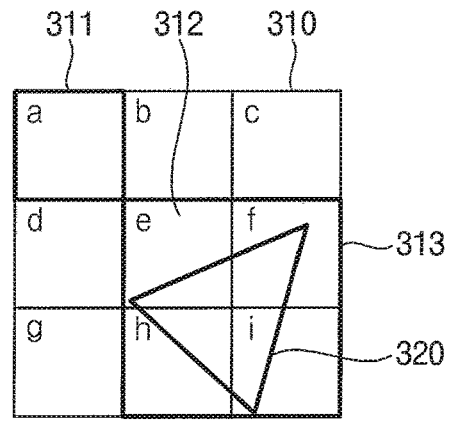
FIG. 10 is a diagram illustrating a frame split into tiles according to an embodiment of the inventive concept.

FIG. 10 is a diagram illustrating a frame split into tiles according to an embodiment of the inventive concept.

Referring to FIG. 10, a certain frame 310 in a video image may include a primitive 320, for example. The GPU 200 may divide the frame 310 that includes the primitive 320 into N×M tiles, where N and M are natural numbers.

Hereinafter, an "initial tile" may denote each of the smallest tiles dividing the frame 310, and an "initial size" may denote a size of the initial tile.

The binning pipeline 240 operation of FIG. 9 may divide the frame 310 that includes the primitive 320 into initial tiles 311 and may determine which of the initial tiles 311 includes a portion of the primitive 320. The bitstream generated as a result of performing the binning pipeline 240 may include information relating to the primitive 320 in each of the initial tiles 311.

After the binning pipeline 240 operation has been performed, the GPU 200 may render the primitive 320 included in the initial tiles 311 per tile and may transform a result of the rendering into pixel expressions. Rendering the primitive 320 per tile and transforming the result of the rendering into the pixel expressions may be performed by the rendering pipeline 250, as shown by FIG. 9.

The rendering pipeline 250 may perform the rendering per tile based on a size of a tile unit. The tile unit used in the rendering may vary in size. An entire or a portion of the primitive 320 may be rendered in the rendering pipeline 250 via a one-time rendering process depending on the tile unit and a combination of tiles. For example, one portion of the primitive 320 may be rendered based on a tile "e" (312) having an initial size as shown, while the entire portion of the primitive 320 may be rendered via the one-time rendering process based on a tile unit 313 with a size of 2×2 tiles (for example, tiles e, f, h, and i).

Figure 11:
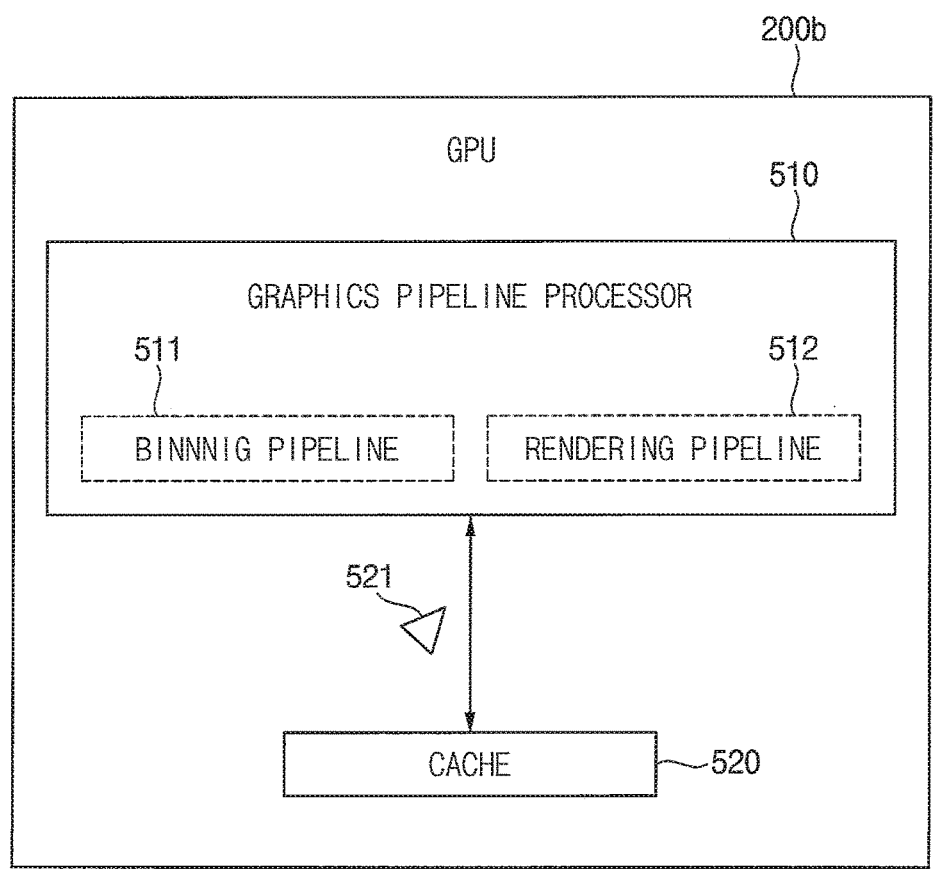
FIG. 11 is a diagram illustrating the utilization of information relating to a primitive in a graphics pipeline processor according to an embodiment of the inventive concept.

FIG. 11 is a diagram illustrating the utilization of information relating to a primitive in a graphics pipeline processor according to an embodiment of the inventive concept.

Referring to FIG. 11, a GPU 200b may include a graphics pipeline processor 510 and a cache 520. The GPU 200b may be implemented as the GPU 200 and the GPU 200a.

A rendering pipeline 512 of the graphics pipeline processor 510 may perform rendering by using bitstream information generated as a result of performing execution of a binning pipeline 511. The graphics pipeline processor 510 may use graphics data stored in the system memory 270 for rendering primitives that are included in tiles by performing execution of the rendering pipeline 512 per tile. The graphics data may include the information relating to a primitive 521, and the information relating to the primitive 521 may be source data such as coordinates and line information of the object.

A processing speed of the GPU 200b when accessing the system memory 270 for rendering the primitives and reading the information relating to the primitive 521 may be slow when compared with a speed during operations that do not involve accessing the system memory 270. Accordingly, the GPU 200b may access the cache 520, which may be an on-chip memory placed therein and may enhance the processing speed of the GPU 200b. For example, in an embodiment, the cache 520 may store the information relating to the primitive 521 that has been recently rendered by the graphics pipeline processor 510. When the information relating to the primitive 521 is identical to information relating to a previously rendered primitive is requested, the graphics pipeline processor 510 may rapidly read the information relating to the primitive 521 by accessing the cache 520 rather than accessing the system memory 270.

However, a storage capacity of the cache 520 may be limited due to characteristics of the on-chip memory. Accordingly, when the graphics pipeline processor 510 requests information relating to a new primitive from the cache 520, information relating to an existing primitive stored in the cache 520 may be deleted and the cache 520 may be updated with the information relating to the new primitive read from the system memory 270. When only a portion of the primitive (hereinafter, the existing primitive) has been rendered as a result of the rendering, the information relating to the existing primitive stored in the cache 520 may be deleted when the other portion of the existing primitive is rendered by updating the cache 520 with the information relating to the new primitive. Since the graphics pipeline processor 510 may again access the system memory 270 and read the information relating to the existing primitive for rendering the other portion of the existing primitive, a bandwidth may increase.

Figure 12:
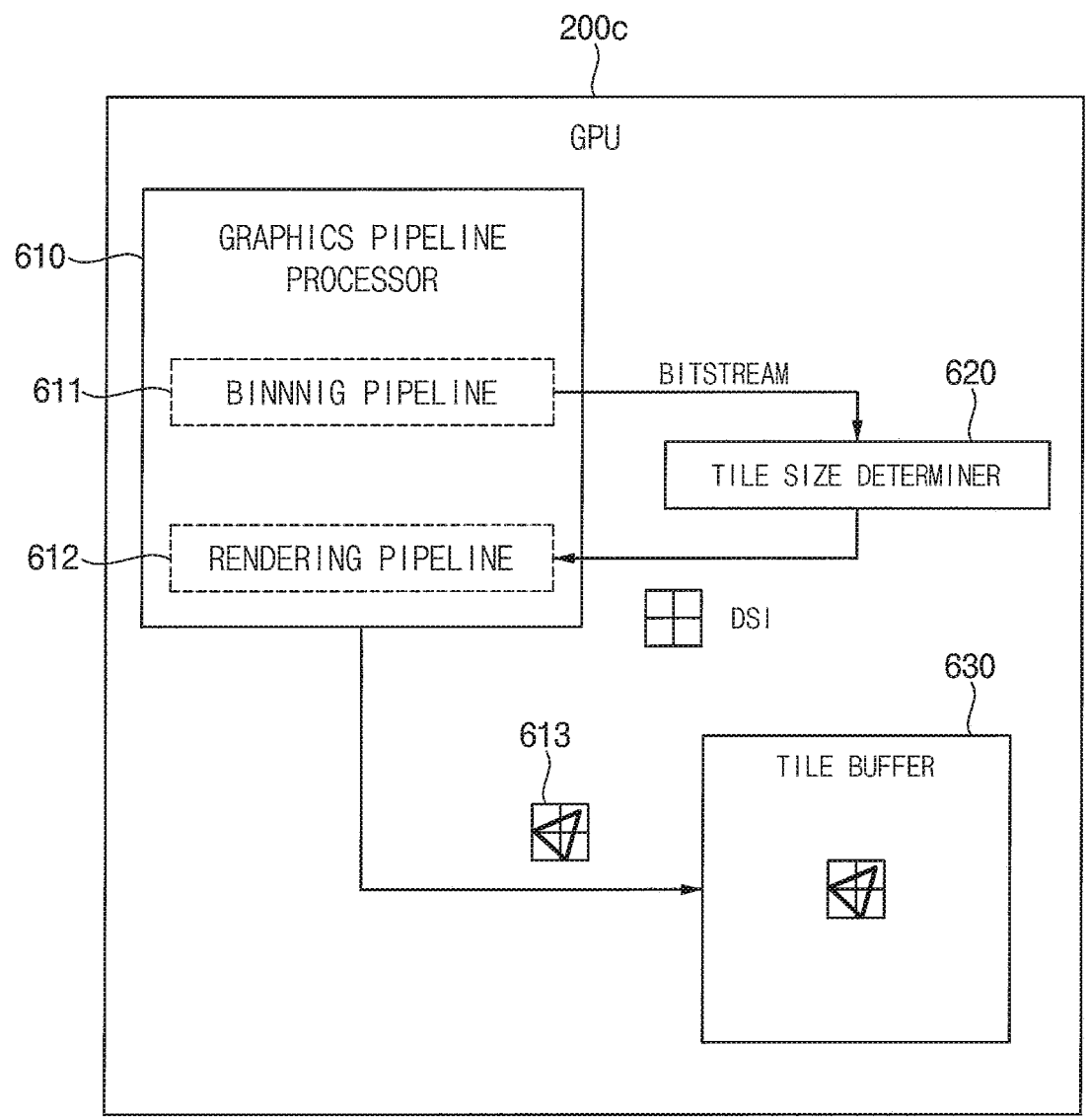
FIG. 12 is a diagram of a tile size determining unit of a GPU performing tile-based rendering according to an embodiment of the inventive concept.

FIG. 12 is a diagram of a tile size determining unit of a GPU performing the TBR according to an embodiment of the inventive concept.

Referring to FIG. 12, a GPU 200c may include a graphics pipeline processor 610, a tile size determining unit (a tile size determiner) 620, and a tile buffer 630. The GPU 200c may be implemented as the GPU 200, the GPU 200a, and the GPU 200b.

The bitstream representing a result of the tile binning operation may be generated after the tile binning has been performed per initial tile by dividing the frame in a binning pipeline 611 of the graphics pipeline processor 610. The bitstream may store information about each initial tile to which a primitive may belong.

The tile size determining unit 620 may determine whether a primitive included in an initial tile is also included in other initial tiles based on the generated bitstream. The initial tile may be a tile having the initial size by which the frame was divided.

The tile size determining unit 620 may determine a rendering tile consisting of at least one of the initial tiles that includes the primitive, and the rendering tile has a dynamic size based on a result of the determining. In addition, the tile size determining unit 620 may perform the rendering for the primitive included in the determined rendering tile per the determined rendering tile. Since sizes of primitives in the frame may be different from each other, the rendering tile having the dynamic size may be variably determined depending on the number of the initial tiles that include the primitive.

For example, when a first primitive is included in only one initial tile, the dynamic size corresponding to the tile unit may be the initial size of the one initial tile. In addition, a second primitive may be included in tiles having the initial tile size. For example, when the second primitive is included in four tiles having the initial tile size, the second primitive may be included in not only one initial tile but also three other initial tiles adjacent to the one initial tile.

The tile size determining unit 620 may provide to the graphics pipeline processor 610 information relating to the dynamic size corresponding to the tile unit. The information about the dynamic size may be referred to as dynamic size information DSI and may be, for example, information relating to an identification value of the primitive, where the identification value of the primitive matches the identification value of at least one initial tile that includes the primitive. However, embodiments of the inventive concept are not necessarily limited thereto.

The graphics pipeline processor 610 may perform the rendering for respective primitives per the tile units corresponding to respective primitives based on the dynamic size information DSI.

For example, when the tile unit is one initial tile, the dynamic size information DSI may be information relating to an identification value of the first primitive, where the identification value of the first primitive matches the identification value of the initial tile that includes the first primitive. In addition, for example, when the tile unit includes the initial tile having the initial tile size and three other initial tiles adjacent to the initial tile, the dynamic size information DSI may be information relating to an identification value of the second primitive, where the identification value of the second primitive matches the identification values of four tiles that include the second primitive and having the initial tile size.

The tile unit may change according to which tile size is used when the rendering is performed in the rendering pipeline 612 of the graphics pipeline processor 610. The rendering pipeline 612 may perform the rendering on an entire portion or a portion of the primitive via the one-time rendering process depending on a size relationship between the primitive and the tile unit.

In an embodiment, the tile unit may be the initial tile having the initial tile size. For example, when the first primitive is included in one initial tile having the initial size, an entire portion of the first primitive may be rendered via a one-time rendering process based on the initial tile having the initial size. In an embodiment, when the second primitive is included in four initial tiles having the initial tile size, only a portion of the second primitive may be rendered by the one-time rendering process based on the initial tile having the initial size.

The tile size determining unit 620 may determine a tile having a dynamic size to which an entire portion of the primitive may be included and provide the information relating to the determined dynamic size to the graphics pipeline processor 610. When the graphics pipeline processor 610 performs rendering on the primitive per the rendering tile having the dynamic size based on the information relating to the dynamic size, the entire portion of the primitive may be rendered via the one-time rendering process.

In an embodiment, after the cache has read the information relating to the primitive from the system memory 270 and updated the information in the cache based on the information in the system memory 270, the graphics pipeline processor 610 may read the information relating to the primitive by accessing only the cache, without having to access the system memory 270 again. Accordingly, performing the rendering of the entire portion of the primitive via the one-time rendering process may reduce the bandwidth of the information relating to the primitive to be read from the system memory 270.

The graphics pipeline processor 610 may perform the rendering on the entire portion of the primitive via an execution of the rendering pipeline 612 based on the information relating to the dynamic size corresponding to the primitive. The graphics pipeline processor 610 may store the rendered primitive 613 in the tile buffer 630.

Figure 13:
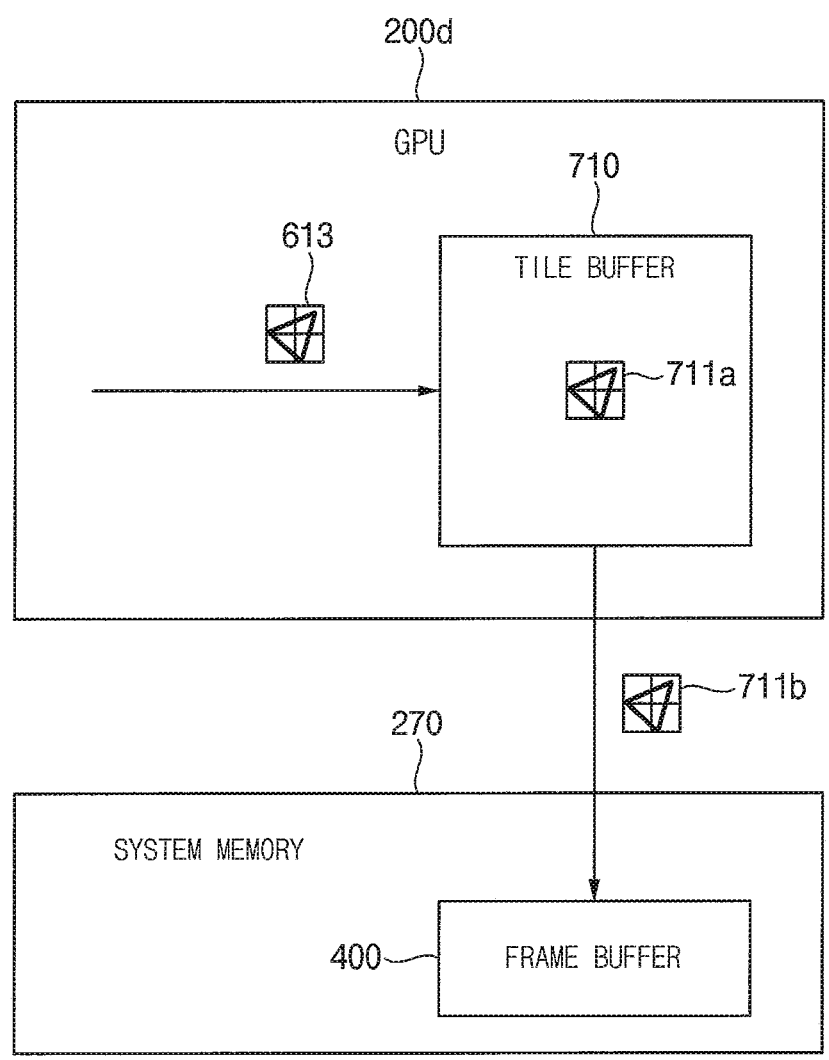
FIG. 13 is a diagram illustrating an operation of storing a rendered primitive in a system memory according to an embodiment of the inventive concept.

FIG. 13 is a diagram illustrating an operation of storing a rendered primitive in a system memory according to an embodiment of the inventive concept.

Referring to FIG. 13, a GPU 200d may include a tile buffer 710. An entire portion of a primitive that has been rendered based on a dynamic size information corresponding to a primitive in a graphics pipeline 230 of the GPU 200d may be stored in the tile buffer 710. The GPU 200c may be implemented as the GPU 200, the GPU 200a, the GPU 200b, and the GPU 200c.

Since the tile buffer 710 implemented as an on-chip memory may have a certain capacity, the rendering tile having the dynamic size may be determined based on the capacity of the tile buffer 710. The tile size determining unit 620 may determine a capacity of the rendering tile having the dynamic size based on the capacity of the tile buffer 710. For example, when the capacity of the tile buffer 710 is limited to a size of 32×32 tiles but the size of the primitive exceeds 32×32, the dynamic size information corresponding to the primitive may be adjusted to 32×32 so as not to exceed the capacity of the tile buffer.

In addition, the GPU 200d may access the system memory 270 and store (or write) a primitive 711a stored in the tile buffer 710 in the frame buffer 400, which may be a storage space allocated in the system memory 270.

When at least one primitive is rendered per tile having a certain size in the graphics pipeline 230 of the GPU 200, at least one primitive that belongs to a tile having the certain size may be stored in the tile buffer 710. When the at least one primitive belonging to the tile that is stored in the tile buffer 710 and has the certain size is stored in the frame buffer 400, a portion of tiles having the initial size that are included in the tile having the initial size may not include any primitive. Thus, even when tiles having the initial size that include no primitive are stored in the frame buffer 720, the bandwidth may increase.

The GPU 200d may perform the rendering by using the dynamic size information corresponding to the primitive that has been determined by the tile size determining unit 620, and may store only the tiles including the primitive in the frame buffer 720. By using the dynamic size information corresponding to the primitive, the bandwidth (for example, an amount of the result of rendering to be stored in the frame buffer 400 allocated in the system memory 270) may be reduced.

Figure 14:
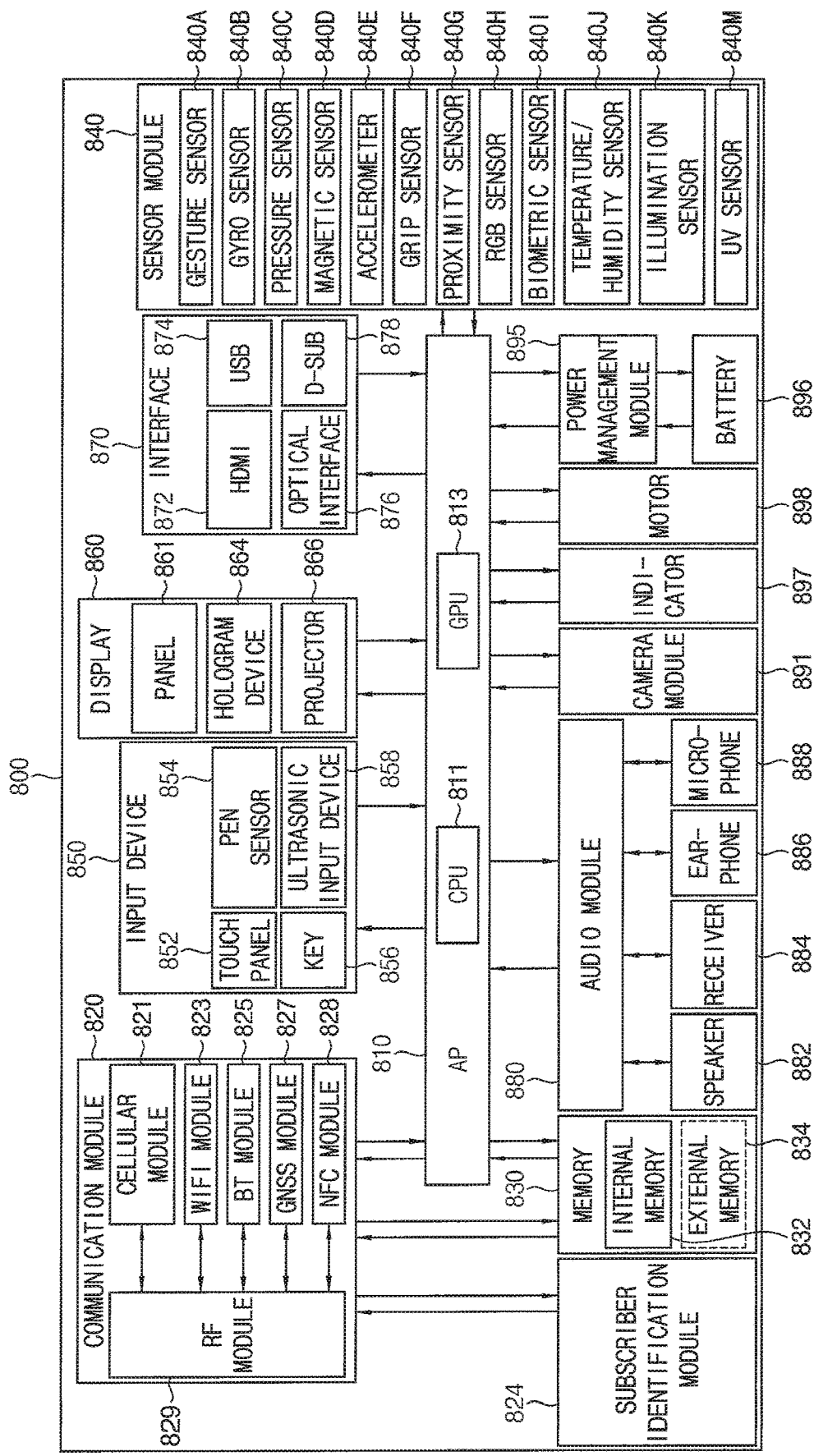
FIG. 14 is a block diagram of a computing system according to an embodiment of the inventive concept.

FIG. 14 is a block diagram of a computing system according to example embodiments.

Referring to FIG. 14, a computing system 800 may include one or more processors (e.g., application processors (APs)) 810, a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898. The computing system 800 may be implemented as the computing system 10.

The application processor 810 may control multiple hardware or software components connected to the application processor 810 by driving an operating system (OS) or an application program, and may perform processing and operations with respect to various data. The application processor 810 may be implemented in, for example, a system on chip (SoC) form.

According to an embodiment, the application processor 810 may include a CPU 811 and a GPU 813. The CPU 811 and the GPU 813 may be respectively implemented as the CPU 100 and the GPU 200 of FIG. 1. Therefore, the CPU 811 may include a GPU driver, and the GPU driver may receive a plurality of commands associated with a plurality of rendering targets that are generated by an application program, may set at least one unused rendering target among the plurality of rendering targets to a delayed submission mode based on instructions of the plurality of the commands, and may delete a command associated with the at least one unused rendering target set to the delayed submission mode in the command buffer in response to a command including an instruction to invalidate a rendering result corresponding to the at least one unused rendering target instead of providing the command to the GPU 813. Therefore, the CPU 811 may not increase latency between the CPU 811 and the GPU 813 and may reduce the power consumption of the GPU 813.

In an embodiment, the application processor 810 may include at least some of the elements included in the computing system 800, such as the cellular module 821. The application processor 810 may load an instruction or data received from at least one elements of the computing system 800, such as a non-volatile memory, into a volatile memory, may process the instruction or data, and may store result data generated in response to processing the instruction or data in the non-volatile memory.

The communication module 820 may include, for example, the cellular module 821, a WiFi module 823, a Bluetooth (BT) module 825, a global navigation satellite system (GNSS) module 827, a near field communication (NFC) module 828, and a radio frequency (RF) module 829.

The cellular module 821 may provide, for example, a voice call, a video call, a text service, or an Internet service over a communication network. In an embodiment, the cellular module 821 may identify and authenticate the computing system 800 in a communication network based on a subscriber identity module (SIM) 824 (e.g., a SIM card). In an embodiment, the cellular module 821 may perform at least one function that may be provided by the application processor 810.

In an embodiment, the cellular module 821 may include a communication processor (CP). In an embodiment, at least some (e.g., two or more) of the cellular module 821, the WiFi module 823, the BT module 825, the GNSS module 827, and the NFC module 828 may be included in one integrated chip (IC) or IC package.

The RF module 829 may, for example, transmit and receive a communication signal (e.g., an RF signal). The RF module 829 may include a transceiver, a power amplifier module (PAM), a frequency filter, a low noise amplifier (LNA), or an antenna. In an embodiment, at least one of the cellular module 821, the WiFi module 823, the BT module 825, the GNSS module 827, and the NFC module 828 may transmit and receive an RF signal through the separate RF module.

The SIM 824 may, for example, include a card including a SIM or an embedded SIM, and may include unique identification information (e.g., an integrated circuit card identifier (ICCID) or subscriber information (e.g., an international mobile subscriber identity (IMSI)).

The memory 830 may, for example, include an internal memory 832 and/or an external memory 834.

The internal memory 832 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OT-PROM), programmable ROM (PROM), erasable and programmable ROM (EPROM), electrically erasable and programmable ROM (EEPROM), etc.), mask ROM, flash ROM, a flash memory, and a solid state drive (SSD).

The external memory 834 may further include a flash drive (for example, a compact flash (CF) drive, a secure digital (SD) drive, a micro-SD drive, a mini-SD drive, an extreme Digital (xD) drive, a multi-media card (MMC), or a memory stick). The external memory 834 may be functionally or physically connected with the computing system 800 through various interfaces.

The sensor module 840 may measure a physical quantity or may sense an operation state of the computing system 800, and may convert the measured or sensed information into an electric signal.

The sensor module 840 may, for example, include at least one of a gesture sensor 840A, a gyro sensor 840B, a pressure sensor 840C, a magnetic sensor 840D, an acceleration sensor (accelerometer) 840E, a grip sensor 840F, a proximity sensor 840G, a color sensor 840H (e.g., red/green/blue (RGB) sensor), a biometric sensor 840I, a temperature/humidity sensor 840J, an illumination sensor 840K, and an ultraviolet (UV) sensor 840M.

Additionally or alternatively, the sensor module 840 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit configured to control at least one sensor included therein. In an embodiment, the application processor 810 may further include a processor configured to control the sensor module 840. In an embodiment, the computing system 800 may further include a processor configured to control the sensor module 840 during a sleep state of the application processor 810.

The input device 850 may include, for example, a touch panel 852, a (digital) pen sensor 854, a key 856, and/or an ultrasonic input device 858, although embodiments of the inventive concept are not necessarily limited thereto. The input device 850 may be configured to receive commands from outside of the computing system 800. The touch panel 852 may be at least one of a capacitive type, a resistive type, an IR type, or an ultrasonic type. The touch panel 852 may further include a control circuit.

The touch panel 852 may further include a tactile layer to provide tactile reaction to the user. The (digital) pen sensor 854 may include a recognition sheet in the touch panel 852, or may include a recognition sheet that is separate from the touch panel 852. The key 856 may include a physical button, an optical key, or a keypad. The ultrasonic input device 858 may sense ultrasonic waves generated by an input means through a microphone (e.g., the microphone 888) and may check data corresponding to the sensed ultrasonic waves.

The display 860 may include a panel 862, a hologram device 864, a projector 866, and/or a control circuit for controlling the components of the display 860. In an embodiment, the panel 862 may be flexible, transparent, or wearable. In an embodiment, the panel 862 may be implemented with the touch panel 852 as one module.

In an embodiment, the panel 862 may include a pressure sensor (or a "force sensor") capable of measuring a pressure of a user's touch. The pressure sensor may be implemented integrally with the touch panel 852 or may be implemented as one or more sensors separate from the touch panel 852. The hologram device 864 may display a stereoscopic image in air external to the computing system 800 based on interference of light. The projector 866 may display an image onto a screen by projection of light. The screen may be positioned inside or outside the computing system 800.

The interface 870 may include an HDMI 872, a USB 874, an optical interface 876, or a D-subminiature (D-sub) 878. Additionally or alternatively, the interface 870 may include a mobile high-definition link (MHL) interface, an SD/multimedia card (MMC) interface, or an Infrared Data Association (IrDA) interface.

The audio module 880 may bi-directionally convert sound and an electric signal. The audio module 880 may process sound information input or output through the speaker 882, the receiver 884, the earphone 886, or the microphone 888.

The camera module 891 may be, for example, a device capable of capturing a still image or a moving image, and in n embodiments, may include one or more image sensors (e.g., a front sensor or a rear sensor), a lens, an image signal processor (ISP), or a flash (e.g., an LED, a xenon lamp, etc.).

The power management module 895 may manage power of the computing system 800. In an embodiment, the power management module 895 may include a power management integrated circuit (PMIC), a charger IC, and/or a battery fuel gauge.

The PMIC may include a wired and/or wireless charging scheme. The wireless charging scheme may include a magnetic-resonance type scheme, a magnetic induction type scheme, and an electromagnetic type scheme, and may further include an additional circuit for wireless charging (for example, a coil loop, a resonance circuit, or a rectifier). The battery gauge may measure the remaining capacity of the battery 896 or the voltage, current, or temperature of the battery 896 during charging. The battery 896 may include, for example, a rechargeable battery and/or a solar battery.

The indicator 897 may display a particular state, for example, a booting state, a message state, or a charging state, of the computing system 800 or a part thereof (e.g., the application processor 810). The motor 898 may convert an electric signal into a mechanical vibration or may generate vibrations or a haptic effect. The computing system 800 may include a device configured to process media data (such as a GPU) according to a standard such as digital multimedia broadcasting (DMB), digital video broadcasting (DVB), or mediaFlo™.

Embodiments of the inventive concept may be applied to various computing systems that include a CPU and a GPU. For example, the embodiments of the inventive concept may be applied to computing systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

While the inventive concept has been particularly shown and described with reference to embodiments thereof, it will be understood by those of ordinary skill in the art that various changes in form and detail may be made therein without departing from the spirit and scope of the inventive concept as defined by the present disclosure.

What is claimed is:

1. A method of operating a computing system, the method comprising:
   receiving, by a GPU driver included in a CPU of the computing system, a plurality of commands associated with a plurality of rendering targets included in a frame buffer of the computing system;
   storing the plurality of commands in a command buffer included in the GPU driver;
   setting, by a command manager included in the GPU driver, at least one unused rendering target among the plurality of rendering targets to a delayed submission mode; and
   selectively deleting, by the command manager, a command associated with the at least one unused rendering target set to the delayed submission mode from the command buffer based on whether the command includes an instruction to invalidate a rendering result associated with the at least one unused rendering target.

2. The method of claim 1, further comprising:
   setting, by the command manager, the at least one unused rendering target to the delayed submission mode in response to processing a number of consecutive invalidation commands of the plurality of commands equal to a reference number,
   wherein each of the consecutive invalidation commands includes the instruction to invalidate a rendering result associated with the at least one unused rendering target, and
   wherein the reference number is an integer equal to or greater than two.

3. The method of claim 1, further comprising:
   providing, by the command manager, a first command to a GPU included in the computing system, wherein the first command includes an instruction to display a rendering result associated with the at least one unused rendering target.

4. The method of claim 3, further comprising:
   submitting, by the GPU driver, the at least one unused rendering target to the GPU; and
   rendering, by the GPU, an object in the frame buffer based on the first command and the at least one unused rendering target.

5. The method of claim 1, wherein setting the at least one unused rendering target to the delayed submission mode is performed in response to the GPU driver setting a delayed submission mode flag associated with the at least one unused rendering target to a high level.

6. The method of claim 1, wherein:
   the plurality of rendering targets includes a first rendering target and a second rendering target;
   the first rendering target is associated with a first frame buffer object attached to a first region of the frame buffer and the second rendering target is associated with a second frame buffer object attached to a second region of the frame buffer; and
   the plurality of commands includes a first plurality of commands associated with the first rendering target and a second plurality of commands associated with the second rendering target.

7. The method of claim 6, wherein the first plurality of commands are associated with a consecutive invalidation number, and
   wherein the consecutive invalidation number is equal to or greater than a reference number,
   the method further comprising:
   setting, by the command manager, the first rendering target to the delayed submission mode in response to the consecutive invalidation number being equal to or greater than the reference number.

8. The method of claim 7, further comprising:
   deleting, by the command manager, a first command of the first plurality of commands from the command buffer, wherein the first command includes the instruction to invalidate a rendering result associated with the first rendering target.

9. The method of claim 7, further comprising:
   providing, by GPU driver, a first command of the first plurality of commands to a GPU included in the computing system, wherein the first command includes an instruction to display a rendering result associated with the first rendering target.

10. The method of claim 1, further comprising:
    generating, by an application program, the plurality of commands, wherein the application program is stored in a system memory of the computing system and wherein the system memory includes the frame buffer and is driven by the CPU.

11. A computing system comprising:
    a system bus;
    a system memory coupled to the system bus;
    a frame buffer included in the system memory;
    a graphics processing unit (GPU) coupled to the system bus; and
    a central processing unit (CPU) coupled to the system bus, wherein the CPU includes a GPU driver configured to manage a plurality of commands associated with a plurality of rendering targets included in the frame buffer, wherein the plurality of commands are generated by an application program, wherein the GPU driver includes:
a command buffer configured to store the plurality of commands; and
a command manager configured to:
set at least one unused rendering target among the plurality of rendering targets to a delayed submission mode based on instructions included in the plurality of the commands; and
selectively delete a command of the plurality of commands associated with the at least one unused rendering target set to the delayed submission mode from the command buffer when the command includes an instruction to invalidate a rendering result associated with the at least one unused rendering target set to the delayed submission mode.

12. The computing system of claim 11, wherein the command manager is further configured to set the at least one unused rendering target to the delayed submission mode in response to a consecutive invalidation number associated with the at least one unused rendering target being greater than or equal to a reference number,
wherein the reference number is an integer that is greater than or equal to two.

13. The computing system of claim 11, wherein:
the command manager is configured to provide a first command of the plurality of commands to the GPU and submit the at least one unused rendering target to the GPU;
the first command includes an instruction to display a rendering result associated with the at least one unused rendering target; and
the GPU is configured to render an object in the frame buffer based on the command and the at least one unused rendering target.

14. The computing system of claim 11, wherein the command manager is further configured to:
implement a table in the command buffer; and
write a flag associated with the at least one unused rendering target in the table,
wherein the flag corresponds to a number of commands of the plurality of commands that include instructions to invalidate rendering results.

15. The computing system of claim 11, wherein the command manager is further configured to set a delayed submission mode flag associated with the at least one unused rendering target to a high level and to set the at least one unused rendering target to the delayed submission mode in response to the high level.

16. The computing system of claim 11, wherein:
the plurality of rendering targets includes a first rendering target and a second rendering target;
the first rendering target is associated with a first frame buffer object attached to a first region of the frame buffer and the second rendering target is associated with a second frame buffer object attached to a second region of the frame buffer; and
the plurality of commands includes a first plurality of commands associated with the first rendering target and a second plurality of commands associated with the second rendering target.

17. The computing system of claim 16, wherein:
the first plurality of commands are associated with a consecutive invalidation number;
the consecutive invalidation number is equal to or greater than a reference number; and
the command manager is further configured to set the first rendering target to the delayed submission mode in response to the consecutive invalidation number being equal to or greater than the reference number.

18. The computing system of claim 17, wherein the command manager is further configured to delete a first command of the first plurality of commands from the command buffer, wherein the first command includes the instruction to invalidate a rendering result associated with the first rendering target.

19. The computing system of claim 17, wherein the GPU driver is configured to provide a first command of the first plurality of commands to the GPU, and wherein the first command includes an instruction to display a rendering result associated with the first rendering target.

20. A method of operating a computing system, the method comprising:
receiving, by a GPU driver included in a CPU of the computing system, a plurality of commands associated with a plurality of rendering targets included in a frame buffer of the computing system;
storing the plurality of commands in a command buffer included in the GPU driver;
setting, by a command manager in the GPU driver, at least one unused rendering target among the plurality of rendering targets to a delayed submission mode;
deleting, by the command manager, a first command of the plurality of commands associated with the at least one unused rendering target from the command buffer in response to the first command including an instruction to invalidate a first rendering result associated with the at least one unused rendering target set to the delayed submission mode; and
providing, by the command manager, a second command of the plurality of commands to a GPU included in the computing system in response to the second command not including an instruction to invalidate a second rendering result associated with the at least one unused rendering target set to the delayed submission mode.

* * * * *